United States Patent [19]

Schwalm et al.

[11] Patent Number: 5,801,213
[45] Date of Patent: Sep. 1, 1998

[54] RADIATION-CURABLE COMPOSITIONS COMPRISING SURFACE-ACTIVE CAPPED AMINO COMPOUNDS

[75] Inventors: Reinhold Schwalm, Wachenheim; Wolfgang Reich, Maxdorf; Lukas Häussling, Dürkheim; Erich Beck, Ladenburg, all of Germany

[73] Assignee: BASF Aktiengesellschaft, Ludwigshafen, Germany

[21] Appl. No.: 714,421

[22] Filed: Sep. 16, 1996

[30] Foreign Application Priority Data

Sep. 22, 1995 [DE] Germany .................. 195 35 161.4

[51] Int. Cl.$^6$ ............................................ C08F 2/46
[52] U.S. Cl. ................... 522/182; 522/96; 522/103; 522/107
[58] Field of Search .................. 522/182, 96, 103, 522/107, 65, 173

[56] References Cited

U.S. PATENT DOCUMENTS

| | | | |
|---|---|---|---|
| 3,759,807 | 9/1973 | Osborn et al. | 204/159.23 |
| 3,926,636 | 12/1975 | Barzynski et al. | 96/115 R |
| 4,077,859 | 3/1978 | Costanza et al. | 204/159.23 |
| 4,148,658 | 4/1979 | Kondoh et al. | 96/115 P |
| 4,168,981 | 9/1979 | Donald et al. | 96/115 P |
| 4,218,295 | 8/1980 | Lee | 204/159.23 |
| 4,227,979 | 10/1980 | Humke et al. | 204/159.16 |
| 4,386,153 | 5/1983 | Shinozaki et al. | 430/285 |
| 4,478,967 | 10/1984 | Eian et al. | 524/86 |
| 4,740,600 | 4/1988 | Eian et al. | 546/165 |

FOREIGN PATENT DOCUMENTS

| | | | |
|---|---|---|---|
| 5-331366 | 12/1993 | Japan | C08L 75/04 |
| WO 94/28075 | 12/1994 | WIPO | |

OTHER PUBLICATIONS

Database WPI, Derwent Publications, AN 94–023040 & JP-A-5 331 366 Dec. 14, 1993.

*Primary Examiner*—M. Nuzzolillo
*Assistant Examiner*—Steven H. VerSteeg
*Attorney, Agent, or Firm*—Oblon, Spivak, McClelland, Maier & Neustadt, P.C.

[57] ABSTRACT

Radiation-curable compositions of reduced oxygen sensitivity comprise a) radiation-curable, free-radically polymerizable compounds, and b) capped amino compounds which are surface-active in compounds a) and on irradiation with high-energy light liberate amino compounds having primary, secondary or primary and secondary amino groups, the overall number of hydrogen atoms bonded in the amino groups (amine hydrogens) being at least 2.

7 Claims, No Drawings

RADIATION-CURABLE COMPOSITIONS COMPRISING SURFACE-ACTIVE CAPPED AMINO COMPOUNDS

BACKGROUND OF THE INVENTION

FIELD OF THE INVENTION

SUMMARY OF THE INVENTION

The invention relates to radiation-curable compositions of reduced oxygen sensitivity, comprising a) radiation-curable, free-radically polymerizable compounds, and b) capped amino compounds which are surface-active in compounds a) and on irradiation with high-energy light liberate amino compounds having primary, secondary or primary and secondary amino groups, the overall number of hydrogen atoms bonded in the amino groups (amine hydrogens) being at least 2.

The invention additionally relates to a process for preparing moldings or coatings, and to moldings or coatings obtainable by such a process.

DISCUSSION OF THE BACKGROUND

The radiation curing or polymerization of free-radically polymerizable compounds, especially (meth)acrylate compounds, can be severely inhibited by oxygen, especially on the surface. This inhibition leads to incomplete surface curing and thus to tacky coatings, for example. In many cases, therefore, the exclusion of atmospheric oxygen is necessary in order to avoid the disadvantages associated with inhibition.

Nonprior-published German Patent Application 19 520 888.9 (OZ 45918) discloses radiation-curable compositions comprising (meth)acrylate compounds and capped amino compounds.

DE-A-23 46 424 describes the modification of acrylate resins with primary or secondary amines to increase reactivity during radiation curing.

It is an object of the present invention, therefore, to provide radiation-curable compositions based on free-radically polymerizable compounds, especially (meth)acrylate compounds, whose polymerization or curing is uninhibited or, at least, inhibited to a reduced extent by oxygen.

We have found that this object is achieved by the radiation-curable compositions defined at the outset.

DETAILED DESCRIPTION OF THE PREFERRED EMBODIMENTS

Compounds a) are in particular free-radically polymerizable compounds having at least 2 copolymerizable, ethylenically unsaturated groups (compounds $a_1$), of the compounds a), preferably at least 50% by weight, particularly preferably at least 80% by weight and, with very particular preference, at least 90% by weight are compounds $a_1$. In particular, the compounds a are exclusively compounds $a_1$.

Preferred compounds $a_1$ contain 2–20, preferably 2–10 and, with very particular preference, 2–6 copolymerizable, ethylenically unsaturated double bonds.

In particular, compounds $a_1$ are (meth)acrylate compounds, with the acrylate compounds—ie. derivatives of acrylic acid—being preferred in each case.

The number-average molecular weight $M_n$ of the compounds $a_1$, especially (meth)acrylate compounds, is preferably below 15,000, particularly preferably below 5000 and, with very particular preference, below 3000 g/mol and above 180 g/mol (determined by gel permeation chromatography using polystyrene as standard and tetrahydrofuran as eluent).

(Meth)acrylate compounds which may be mentioned are (meth)acrylic esters, and especially acrylic esters of polyfunctional alcohols, especially those comprising, in addition to the hydroxyl groups, either no other functional groups or just ether groups. Examples of such alcohols are bifunctional alcohols, such as ethylene and propylene glycol, and members of the same class with higher degrees of condensation, such as diethylene, triethylene, dipropylene and tripropylene glycol, etc., butanediol, pentanediol, hexanediol, neopentylglycol, alkoxylated phenolic compounds, such as ethoxylated and propoxylated bisphenols, cyclohexanedimethanol, alcohols with a functionality of three or more, such as glycerol, trimethylolpropane, butanetriol, trimethylolethane, pentaerythritol, ditrimethylolpropane, dipentaerythritol, sorbitol, mannitol and the corresponding alkoxylated alcohols, especially ethoxylated and propoxylated alcohols.

The alkoxylation products can be obtained in a known manner by reacting the above mentioned alcohols with alkylene oxides, especially ethylene or propylene oxide. The degree of alkoxylation per hydroxyl group is preferably 0–10; in other words, 1 mol of hydroxyl group can preferably be alkoxylated with up to 10 mol of alkylene oxides.

Further (meth)acrylate compounds are polyester (meth)acrylates, which are the acrylic esters of polyesterols.

Examples of suitable polyesterols are those as can be prepared by esterification of polycarboxylic acids, preferably dicarboxylic acids, with polyols, preferably diols. The starting materials for hydroxyl-containing polyesters of this kind are known to the person skilled in the art. As dicarboxylic acids it is preferably possible to employ succinic, glutaric, adipic, sebacic and o-phthalic acid, their isomers and hydrogenation products, and esterifiable derivatives, such as anhydrides or dialkyl esters of said acids. Suitable polyols are the abovementioned alcohols, preferably ethylene glycol, 1,2- and 1,3-propylene glycol, 1,4-butanediol, 1,6-hexanediol, neopentyl glycol, cyclohexane-dimethanol and polyglycols of the ethylene glycol and propylene glycol type.

Polyester (meth)acrylates can be prepared in a plurality of stages or else in one stage, as described for example in EP 279 303, from acrylic acid, polycarboxylic acid and polyol.

Compounds a) may also, for example, be epoxy or urethane (meth)acrylates.

Examples of epoxy (meth)acrylates are those obtainable by reacting epoxidized olefins or poly- and/or diglycidyl ethers, such as bisphenol A diglycidyl ether, with (meth)acrylic acid.

The reaction is known to the person skilled in the art and is described, for example, in R. Holmann, U.V. and E.B. Curing Formulation for Printing Inks and Paints, London 1984.

Urethane (meth)acrylates are, in particular, reaction products of hydroxyalkyl (meth)acrylates with poly- and/or diisocyanates (see again R. Holmann, U.V. and E.B. Curing Formulation for Printing Inks and Paints, London 1984).

It is of course also possible to employ mixtures of different compounds a), including in particular mixtures of the above (meth)acrylic compounds.

In addition to the compounds a), the novel compositions comprise capped amino compounds b). On irradiation with high-energy light, compounds containing one or more amino groups are formed or liberated, which are able to form adducts with activated double bonds, for example methacrylic or, in particular, acrylic double bonds, in accordance with a Michael addition reaction.

Adduct formation may take place, for example, as follows:

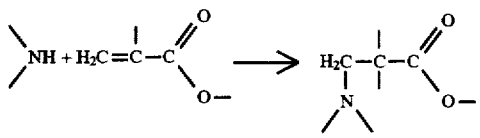

The number of hydrogen atoms bonded in the amino group or groups (amine hydrogens) is at least 2. Their number is preferably 2–6, in particular 2–4.

Since the number of amine hydrogens is at least 2, then correspondingly addition also takes place onto at least 2 activated double bonds and/or acrylic groups.

In the case of a primary amino group (2 amine hydrogens), addition first takes place onto a double bond, producing a secondary amino group. This group is able to add onto a further double bond. Compounds with 2 primary amino groups (4 amine hydrogens) can, correspondingly, form adducts with 4 double bonds, and compounds having 2 secondary amino groups can, correspondingly, form adducts with 2 double bonds.

In every case, such addition leads to chain extension or cross-linking, ie. to curing (referred to in short below as Michael-analogous curing).

The compounds b) are surface-active in compounds a); in other words, compounds b) concentrate at the surface of the compounds a).

In this way, by irradiation with high-energy light, Michael-analogous curing uninhibited by oxygen is brought about at the surface.

The polymerization or curing of the compounds a) otherwise takes place by the customary free-radical mechanism, initiated by the high-energy radiation.

The proportion by weight of the compounds b) is preferably 0.1–20% by weight, particularly preferably 0.1–10% by weight and, with very particular preference, 0.5–5% by weight, based on the sum of compounds a)+b).

Surface activity of the compounds b) in compounds a) can readily be determined by blending the compounds b) with a) and then determining the contact angle as follows:

The radiation-curable composition comprising a)+b) is applied to a glass plate in a layer thickness of 50 μm. After 2 minutes the contact angle of a drop of water placed on the coating is determined.

Since the surface-active substance accumulates at the surface of the coating, the contact angle of the water drop on the coating becomes larger in the case of mixing.

Preferably, the surface activity of the compounds b) in the mixtures of a) and b) is such that the contact angle of a mixture of 99% by weight a) and 1% by weight b), measured 2 minutes after application to the glass surface, is at least 110%, preferably at least 160%, of the corresponding contact angle of the pure compound a).

The compounds b) are, for example, complex compounds in which amino compounds are attached to a central metal atom. In this form the amino groups are unreactive, ie. cannot undergo reaction by Michael addition. By irradiation with high-energy light the amino compounds are liberated from the metal complexes.

Examples of suitable complex compounds are cobalt(III) amine complexes as described in S. K. Weit, C. Kutal and R. D. Allen, Chem. Mater. 4, (1992) 453–457.

Compounds b) may also in particular be amino compounds in which the amino groups are masked by photolabile, organic protecting groups. By irradiation with high-energy light, the protecting groups are removed and the amino compounds liberated. Corresponding compounds are described in V. N. R. Pillai, Photo-removable Protecting Groups in Organic Synthesis, Synthesis, January 1980, pages 1–26.

The photolabile or photoremovable groups are, for example, di-methyl-3,5-dimethoxybenzyloxycarbonyl, benzyloxycarbonyl or a 3-nitrophenyl, phenacyl, 3,5-dimethoxybenzoinyl or 2-nitrobenzyl group. Specific examples of the latter are 2-nitrobenzyl, α-substituted 2-nitrobenzyl, 2-nitrobenzyloxycarbonyl and α-substituted 2-nitrobenzyloxycarbonyl and the 2-nitrophenylethylene glycol group.

Amino compounds masked with the latter can preferably be prepared by reacting corresponding nitrobenzyl alcohols with isocyanates, such as aliphatic, cycloaliphatic and aromatic diisocyanates, for example 1,4-butane diisocyanate, 1,6-hexane diisocyanate, 2,2,4-and 2,4,4-trimethylhexamethylene diisocyanate, cyclohexane diisocyanate, methylcyclohexane diisocyanate, isophorone diisocyanate, 4,4'-diisocyanatodiphenyl-methane, 4,4'-diisocyanatodicyclohexyl-methane, 2,4- and 2,6-tolylene diisocyanate, tetramethylxylylene diisocyanate or else addition products of, in particular, diisocyanates, these products containing uretdione, biuret and isocyanurate groups.

Compounds b) which are surface-active in (meth)acrylate compounds a) are, in particular, capped amino compounds with a long-chain hydrocarbon, fluorocarbon or fluorohydrocarbon radical, having preferably 10–40, especially 16–30, carbon atoms. Examples which may be mentioned are compounds of the formula

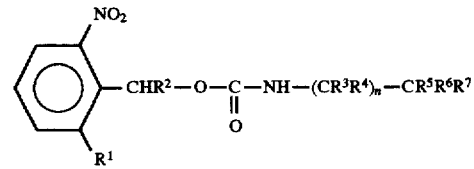

where $R^1$ is H or $NO_2$, $R^2$ is H or $C_1$-$C_8$-alkyl, preferably $C_1$-$C_3$-alkyl, and $R^3$ to $R^7$ independently of one another are each H or F, and n is 15–29.

On irradiation with high-energy light, compound I gives off a primary amine compound of the formula

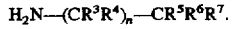

Mention may also be made of compounds of the formula II

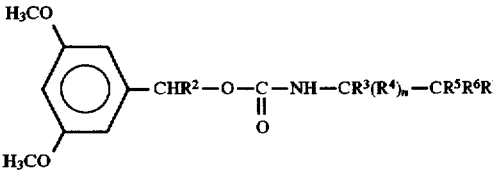

where $R^2$–$R^7$ are as defined above. On irradiation with high-energy light, correspondingly, the same primary amine compound is liberated as above.

The compounds I and II are known per se and can easily be prepared by reacting the corresponding nitrobenzyl alcohols with isocyanates, for example long-chain linear or branched aliphatic isocyanates, or fluorinated linear or branched aliphatic, cycloaliphatic or aromatic isocyanates, for example octadecyl isocyanate.

The novel composition can comprise additives customary for the intended use.

When used as a coating composition these additives may, for example, be pigments, dyes, fillers, etc.

The radiation-curable compounds a) can be free-radically cured by means of UV light or electron beams.

For radiation curing by UV light it is common to add photoinitiators in amounts of up to 5% by weight based on the compounds a).

Examples of suitable photoinitiators are benzophenone, alkyl-benzophenones, halomethylated benzophenones, Michler's ketone, anthrone and halogenated benzophorones. Also suitable are benzoin and derivatives thereof. Photoinitiators of similar effectiveness are anthraquinone and many of its derivatives, for example β-methylanthraquinone, tert-butylanthraquinone and anthraquinone-carboxylic esters and—particularly effective photoinitiators—acylphosphine oxides, for example 2,4,6-trimethylbenzoyldiphenyl-phosphine oxide (Lucirin® TPO).

Solvents as well can be added to the novel compositions in order, for example, to establish the processing viscosity.

Particularly suitable solvents are those in which compounds b) are also readily soluble, examples being dimethylformamide, N-methylpyrrolidone, butyl acetate, methylpropylene glycol acetate and diethylene glycol dimethyl ether.

The radiation curing of the novel compositions employs high-energy light of the wavelength at which, depending on the nature of the compounds b), the amino compounds are liberated. The Michael addition reaction takes place spontaneously, immediately following the liberation of the amino compounds. In order to accelerate the Michael addition reaction it is possible for the temperature during irradiation or thereafter to be held at 40°–120° C. In general, however, no temperature increase is necessary.

The free-radical curing of the composition can be carried out prior to or after the above-described Michael-analogous curing using electron beams or UV light, should the required wavelength range for the liberation of the amino compounds in b) and for the free-radical curing of a) be different.

In general, however, the high-energy light used, for example UV light with a wavelength of 240–400 nm or electron beams will be equally suitable for both Michael-analogous curing and free-radical curing, so that both curing mechanisms take place simultaneously on irradiation with high-energy light.

The novel compositions cure to give tack-free coatings or moldings with good mechanical properties, such as a high degree of hardness and good elastic properties.

Almost no inhibition by oxygen is observed, so that exclusion of oxygen can be done away with in part or completely.

EXAMPLES

Compound 1: Reaction product of octadecyl isocyanate and o-nitro-benzene

A urethane (compound 1) is prepared from octadecyl isocyanate and O-nitrobenzyl alcohol, as described in C. G. Willson et al., SPIE, Advances in Resist Technology and Processing X, Vol. 1925 (1993) 354–65.

38.3 parts of 2-nitrobenzyl alcohol are placed in 344 parts of toluene, 73.9 parts of octadecyl isocyanate are then added dropwise over the course of 60 minutes at reflux (about 113° C.) and the mixture is subsequently stirred for a further 4.5 hours. No remaining NCO band can be detected in the IR spectrum. Cooling (<37° C.) precipitates white crystals which are filtered off with suction, washed with toluene and dried under reduced pressure, to give 71.7 parts of a powder of melting point 79°–80° C. The NMR spectrum confirms the expected structural formula of the urethane from octadecyl isocyanate and nitrobenzyl alcohol. The substance is soluble to 8% by weight in THF, to 1% by weight in toluene and is soluble with heating in some acrylates.

To demonstrate that an amine is formed on exposure to light, the substance is dissolved in THF and the solution is applied to an NaCl plate. Following exposure with an excimer laser (248 nm), after 180 seconds there is a slight decrease in the CO band at 1740 $cm^{-1}$ and a slight increase in the amine band at 3500$cm^{-1}$, and after 600 seconds a marked decrease and, respectively, increase in each of the bands is observed.

Surface activity 1 part by weight of the compound 1 is dissolved in 99 parts by weight of a urethane acrylate resin prepared from the isocyanurate of hexamethylene diisocyanate and hydroxyethyl acrylate. A film of the solution is drawn onto a glass plate, and then the contact angle is measured after various times; after 0.5 minutes it is 36°, after 2 minutes 41°. The contact angle of the pure urethane acrylate resin is only 20° and shows no change over time during storage.

Compound 2: Reaction product of 3,5-dimethoxybenzyl alcohol with octadecyl isocyanate 42 parts of 3,5-dimethoxybenzyl alcohol are placed in 378 parts of toluene. 5 parts of dibutyltin dilaurate are added, and then 74 parts of octadecyl isocyanate are added dropwise over the course of 60 minutes at reflux temperature (about 109° C.) and the mixture is subsequently stirred at reflux for 5 hours. In the icebath (<10° C.), white crystals are precipitated (yield: 57 parts). None of the starting compounds are now evident in the thin-layer chromatogram. The substance is pure according to H-NMR spectroscopy.

The test to see whether exposure to light produces an amino compound and the surface activity test were carried out as above.

On exposure, a distinct decrease in the 1730 $cm^{-1}$ carbonyl band is evident after only 180 seconds. The contact angle of the mixture of the compound 2 with the urethane acrylate resin was 43° after 0.5 minute and 47° after 2 minutes.

EXAMPLE 1

A solution of 1 part by weight of compound 2 in the above polyurethane acrylate resin is admixed with 3% of Irgacure 500 as photoinitiator, the mixture is then drawn onto a glass plate in a layer thickness of 50 μm, and the resulting film is exposed under normal atmospheric conditions (air) using mercury lamps (2×80 W) at a conveyor belt speed of 25 m/min. The contact angle is 61°. The surface is tack-free.

COMPARATIVE EXAMPLE 1 a)

The procedure of Example 1 is repeated but omitting the compound 2; the resulting contact angle of the polyurethane acrylate resin is 53°, and the resulting surface is tacky.

We claim:

1. A radiation-curable composition of reduced oxygen sensitivity, comprising
   a) radiation-curable, free-radically polymerizable compounds, and
   b) capped amino compounds which are surface-active in compounds a) and on irradiation with light liberate amino compounds having primary, secondary or primary and secondary amino groups, the overall number of amine hydrogens being at least 2.

2. A composition as claimed in claim 1, wherein at least 50% by weight of the compounds a) are (meth)acrylate compounds having two or more (meth)acrylic groups.

3. A composition as claimed in claim 1, wherein the content of the compounds b) is 0.1–20% by weight based on the sum of a) +b).

4. A process for preparing a composition as claimed in claim 1, which comprises adding compounds b) to the compounds a).

5. A process for producing a coating or molding, which comprises irradiating a composition as claimed in claim 1 with light.

6. A molding composition or coating composition obtained by a process as claimed in claim 5.

7. A radiation-curable composition of reduced oxygen sensitivity, comprising
   a) radiation-curable, free-radical polymerizable compounds, and
   b) capped amino compounds which are surface-active in compounds a) and on irradiation with light liberate amino compounds having primary, secondary or primary and secondary amino groups, the overall number of amine hydrogens being at least 2, wherein the content of the compounds b) is 0.1–20% by weight based on the sum of a)+b) and wherein a surface activity of compound b) in a mixture of 99% by weight a) and 1% by weight b), measured 2 minutes after application to a glass surface, is at least 110% of a corresponding contact angle of pure compound a).

* * * * *